(12) United States Patent
Yin et al.

(10) Patent No.: US 11,853,981 B2
(45) Date of Patent: Dec. 26, 2023

(54) SYSTEMS AND METHODS FOR E-COMMERCE CHECKOUT WITH DELAY LOADING OF CHECKOUT OPTIONS

(71) Applicant: SHOPIFY INC., Ottawa (CA)

(72) Inventors: Weiyi Yin, Tampa, FL (US); Tejas Mehta, Mississauga (CA); George Tzavelas, Carp (CA); Andrey Gargul, Toronto (CA); Linda Damus, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/465,409

(22) Filed: Sep. 2, 2021

(65) Prior Publication Data
US 2023/0063784 A1    Mar. 2, 2023

(51) Int. Cl.
*G06Q 20/08*     (2012.01)
*G06Q 10/083*    (2023.01)
(Continued)

(52) U.S. Cl.
CPC ....... *G06Q 20/0855* (2013.01); *G06F 3/0482* (2013.01); *G06F 9/451* (2018.02);
(Continued)

(58) Field of Classification Search
CPC ............. G06Q 20/0855; G06Q 10/083; G06F 3/0482; G06F 9/451
See application file for complete search history.

(56) References Cited

U.S. PATENT DOCUMENTS

2017/0193507 A1*  7/2017  Jones ............... G06Q 20/10
2017/0199850 A1   7/2017  Mishra et al.
(Continued)

FOREIGN PATENT DOCUMENTS

| AU | 2021103671 A4 * | 8/2021 | |
| WO | WO-2019053441 A1 * | 3/2019 | ............ G06F 16/29 |
| WO | WO-2019062008 A1 * | 4/2019 | ........... G06F 3/0233 |

OTHER PUBLICATIONS

O. Tounekti, A. Ruiz-Martínez and A. F. Skarmeta Gómez, "Users Supporting Multiple (Mobile) Electronic Payment Systems in Online Purchases: An Empirical Study of Their Payment Transaction Preferences," in IEEE Access, vol. 8, pp. 735-766, 2020. (Year: 2020).*

(Continued)

*Primary Examiner* — Virpi H Kanervo
(74) *Attorney, Agent, or Firm* — Smart & Biggar LP

(57) ABSTRACT

Systems and methods for progressively providing checkout options during a checkout transaction are provided. During a transaction process, a user interface with an options category having a set of checkout options is provided. Requests associated with the checkout options are transmitted, with at least one of the transmitted queries being transmitted to a remote third-party. One or more of the checkout options are identified as a first set of options and others are identified as a second set of options. The user interface is updated to display the first set of options and a selectable UI element prior to display of the second set of options, where all of the second set of options are hidden from display prior to selection of the selectable UI element. The checkout transaction is completable using one of the options from the first set of options without display of the second set of options.

20 Claims, 12 Drawing Sheets

(51) Int. Cl.
  *G06Q 20/12* (2012.01)
  *G06Q 30/0601* (2023.01)
  *G06F 9/451* (2018.01)
  *G06F 3/0482* (2013.01)

(52) U.S. Cl.
  CPC .......... *G06Q 10/083* (2013.01); *G06Q 20/12* (2013.01); *G06Q 30/0641* (2013.01)

(56) References Cited

U.S. PATENT DOCUMENTS

| | | | |
|---|---|---|---|
| 2018/0343495 A1* | 11/2018 | Loheide | H04N 21/47217 |
| 2019/0188579 A1 | 6/2019 | Manoharan et al. | |
| 2021/0398194 A1* | 12/2021 | Sabor | G06F 9/542 |
| 2022/0222662 A1* | 7/2022 | Ketharaju | G06Q 20/38215 |

OTHER PUBLICATIONS

Teresa Fernandes and Rui Pedroso. The effect of self-checkout quality on customer satisfaction and repatronage in a retail context. Serv Bus (2017) 11:69-92. (Year: 2017).*

Wikipedia—"Disclosure Widget", https://en.wikipedia.org/w/index.php?title=Disclosure_widget&oldid=880960347 Jan. 30, 2019.

ip.com—"A method to generate a customized loading indicator for portal pages". Mar. 4, 2009.

European Patent Office, "Extended European Search Report" for EP Patent Application No. 22173103.7 . dated Oct. 19, 2022.

\* cited by examiner

E-Commerce Platform

Q Search (JG) John's Apparel / Jonny B. Good

- ⌂ Home
- ⟲ Orders
- ⌂ Products
- ⌂ Customers
- ⌂ Reports
- ⌂ Discounts
- ⌂ Apps

SALES CHANNELS ⊕
- ⌂ Online Store ◆
- ⌂ Mobile App

View all channels

⚙ Settings

Good afternoon, Jonny B..

Here's what's happening with your store today.

Today's total sales    Today's visits
$98.00             1

- Update your Platform Payments tax details
  We require additional information to verify your identity.
  [Update tax details]

- Advanced Cash on Delivery has been deactivated for your store
  [See why]

All channels ⌄    Today ⌄

TOTAL SALES
$98.00

$125
$75
$25

12am    8pm    4pm    11pm
Jun 1
2 orders

TOTAL SALES BY CHANNEL    View dashboard

Online Store    Jun 1
$0.00                0 orders

Mobile app
$0.00                0 orders

Shopify POS (126 York St.)
$0.00                0 orders

FIG. 2

SYSTEMS AND METHODS FOR E-COMMERCE CHECKOUT WITH DELAY LOADING OF CHECKOUT OPTIONS

FIELD

The present disclosure is related to systems and methods for completing a checkout transaction. In particular, the present disclosure relates to systems and methods for enabling completion of a checkout transaction despite all possible checkout options not having yet been loaded such as where checkout options may be delay loaded.

BACKGROUND

A customer wishing to purchase a product using an online service (e.g. an online e-commerce platform, or a dedicated online checkout service) may be required to complete the purchase by completing a checkout transaction. During the checkout transaction (or simply the checkout), a customer is often provided with selectable options for different components or aspects of the transaction that cannot be determined ahead of time. These components/aspects may be services that include operations provided by third-party service providers, such as shipping. Because third-party services and rates can often change, many of the selectable options often require the online platform to make external calls (such as application programming interface (API) calls) out to the external remote server of the third-party service provider in order to determine their current rates.

External calls made during checkout typically require a round-trip request-and-response from a third-party application that is hosted at the remote server. The speed of such an external call may be dependent on the level of technology infrastructure, server speeds, and network connection speeds provided by the third parties and/or the connectivity providers. As such, delays in such external calls may be largely caused by delays that are outside the control of the online service that is providing the checkout.

Upon encountering such a delay, a customer may be presented with a loading cursor (e.g. a spinner) in a checkout user interface (UI) to indicate that checkout options are being loaded. The customer then has to wait for all of the options to be loaded and displayed before continuing with the checkout transaction.

SUMMARY

In existing online checkout systems, all checkout options need to be loaded and available for user selection before the checkout transaction can be completed. If a response from a remote third-party server is required for some of the checkout options, the wait for a response can lead to delays in the checkout transaction.

However, it can be an inefficient use of computer resources to require all external calls to be completed (i.e., response received from the remote server) before the checkout transaction itself can be completed. Loading and displaying all third-party checkout options for multiple option categories can be both time consuming and a drain on the computer resources (e.g. including computer processing capacity, memory resources, etc.) of the online service that is providing the checkout process, especially since a customer may be only required to select one checkout option in each option category in order to complete the transaction. Further, network resources (e.g. network bandwidth, network ports, etc.) are consumed by responses to the external calls, even though the responses may be for options that end up not being selected by the customer (meaning the information and data carried in those responses are wasted). Thus, in the end, computer resources (including the processing power, memory storage, and bandwidth used to make all of the third-party calls, and to load and display all of the checkout options for all of the option categories) are essentially "wasted" for the unselected checkout options.

Further, delays that occur during checkout can cause customer confusion, as the customer may perceive or assume that the UI is unresponsive. This may result in a customer cancelling their transaction, leaving/reloading the page, or the transaction being interrupted, etc., all of which can also be a further waste of computer resources (e.g. wasted processing power and memory resources to reload the checkout page). Even if the customer does not reload the checkout page, there is still a waste of computer resources because the memory resources required to carry out the checkout transaction are occupied (and unavailable for use in other processes) until the checkout transaction is completed or abandoned. It should be understood that such wastage is greatly amplified by the large number of customers who may be simultaneously attempting to complete a checkout using the online service. Thus, delays in the checkout transaction may cause not only inconvenience to a customer, but may also result in significant drain on computer resources.

Thus, the present disclosure relates to methods and systems to enable completion of a checkout transaction even if all possible checkout options are not yet loaded. In particular, one or more possible checkout options may be delay loaded. Examples of the present disclosure provide technical improvements in that checkout options may be automatically categorized into first and second sets of options (such as quick-load or slow-load). The second set/slow-load options, also referred to as delay loaded options, are hidden from display until a UI element (e.g. an expander) is selected by the customer, while at least one of the options in the first set/quick-load options is immediately displayed (e.g. as soon as information for the at least one displayed option becomes available). The second set of options may be delay loaded (e.g., loaded and available to display only after a certain amount of time). The customer can complete the checkout transaction with the at least one option of the first set of options, even if the second set of options have not yet loaded or are not yet available. This provides the technical advantage that the checkout transaction can be completed without having to waste time and/or computer resources to load all possible checkout options (including third-party checkout options that require external calls to remote servers).

In some examples, the present disclosure describes a system comprising: at least one processor and at least one memory, the at least one memory storing instructions executable by the at least one processor to cause the system to: provide, to a remote client device via a network, a user interface for completing a checkout transaction, the user interface including an options category associated with the checkout transaction, the options category having an associated set of checkout options; transmit, via the network, requests associated with respective ones of the checkout options, at least one of the transmitted queries being transmitted to a remote third-party server, wherein selection of one of the checkout options is required to complete the checkout transaction; identify one or more of the checkout options as a first set of options and others of the checkout options as a second set of options; send an indication to the remote client device to update the user interface to display at least one of the checkout options from the first set of options after receipt of a reply to one or more of the requests and prior to display of the second set of options; send an indication to the remote client device to display a selectable user interface element, wherein all of the second set of options are hidden from display prior to selection of the selectable user interface element; and enable completion of the checkout transaction using one of the checkout options from the first set of options displayed on the user interface, prior to receiving responses from respective queries for all of the second set of options.

In the above example, the first set of options may be quick-loading options, and the second set of options may be slow-loading options, wherein the quick-loading options load faster than the slow-loading options.

In any of the above examples, one option of the first set of options displayed may be automatically selected as a default option, and the at least one processor may be further configured to execute the instructions to cause the system to: responsive to selection of the option to complete the checkout transaction, trigger completion of the checkout transaction using the default option.

In any of the above examples, the at least one processor may be further configured to execute the instructions to cause the system to: responsive to selection of the selectable user interface element at the remote client device, send an indication to the remote user device to update the user interface to: display any remaining quick-loading options, and display a loading indicator for the slow-loading options when responses from the respective queries have not all been received; or display the slow-loading options for which responses from the respective queries have all been received.

In any of the above examples, the at least one processor may be further configured to execute the instructions to cause the system to transmit the queries for checkout options in response to detecting a trigger event.

In any of the above examples, the options category may relate to shipping and the trigger event may be receipt of a shipping address.

In any of the above examples, the at least one processor may be further configured to execute the instructions to cause the system to determine, based on any responses from the queries, whether each of the checkout options belongs in the first set of options or in the second set of options.

In any of the above examples, each of the checkout options may be determined to be the first set of options or the second set of options based on at least one of: a threshold cut-off time for receiving a response; historical measurements for receiving a response from similar queries; analysis of network communications and/or fulfilment network configurations related to each query; and a merchant configuration.

In any of the above examples, the available checkout options may be determined to be quick-loading or slow-loading based on the threshold cut-off time, the threshold cut-off time being dynamically determined for a customer based on the customer's historical response times.

In any of the above examples, the at least one processor may be further configured to execute the instructions to cause the system to: identify faster and slower loading options of the slow-loading options, where in the slower slow-loading options require more time to receive a response from the respective query than the faster slow-loading options; and responsive to selection of the selectable user interface element: display any remaining quick-loading options; and display the faster slow-loading options after receiving responses from respective queries for the faster slow-loading options, prior to displaying the slower slow-loading options.

In some example aspects, the present disclosure describes a method comprising: providing a user interface to a remote client device via a network for completing a checkout transaction, the user interface including an options category associated with the checkout transaction, the options category having an associated set of checkout options; transmitting requests associated with respective ones of the checkout options via the network, at least one of the transmitted queries being transmitted to a remote third-party server, wherein selection of one of the checkout options is required to complete the checkout transaction; identify one or more of the checkout options as a first set of options and others of the checkout options as a second set of options; sending an indication to the remote client device to update the user interface to display at least one of the first set of options after receipt of a reply to one or more of the requests and prior to display of the second set of options; sending an indication to the remote client device to display a selectable user interface element on the user interface, wherein all of the second set of options are hidden from display prior to selection of the selectable user interface element; and enabling completion of the checkout transaction using one of the at least one of the first set of options displayed on the user interface, prior to receiving responses from respective queries for all of the second set of options.

In some examples, the method may include any of the steps performed by the processor described herein.

In some example aspects, the present disclosure describes a computer-readable medium storing instructions that, when executed by a processor of a system, cause the system to: provide, to a remote client device via a network, a user interface for completing a checkout transaction, the user interface including an options category associated with the checkout transaction, the options category having an associated set of checkout options; transmit, via the network, requests associated with respective ones of the checkout options, at least one of the transmitted queries being transmitted to a remote third-party server, wherein selection of one of the checkout options is required to complete the checkout transaction; identify one or more of the checkout options as quick-loading options and others of the checkout options as slow-loading options; send an indication to the remote client device to update the user interface to display at least one of the quick-loading options after receipt of a reply to one or more of the requests and prior to display of the slow-loading options; send an indication to the remote client device to display a selectable user interface element on the user interface, wherein all of the slow-loading options are hidden from display prior to selection of the selectable user interface element; and enable completion of the checkout transaction using one of the at least one of the quick-loading options displayed on the user interface, prior to receiving responses from respective queries for all of the slow-loading options.

In some examples, the computer-readable medium, when executed by the processor, may cause the system to perform any of the methods described herein.

BRIEF DESCRIPTION OF THE DRAWINGS

Reference will now be made, by way of example, to the accompanying drawings which show example embodiments of the present application, and in which:

FIG. 2 is an example homepage of an administrator, which may be accessed via the e-commerce platform of FIG. 1;

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform. For example, a checkout transaction for completing an online purchase may be provided by an online checkout service that is not necessarily part of an e-commerce platform. In another example, an online store, which may not be hosted by an e-commerce platform (i.e. the online store is a standalone online store) may provide an online checkout service. Other such possibilities are contemplated within the scope of the present disclosure.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
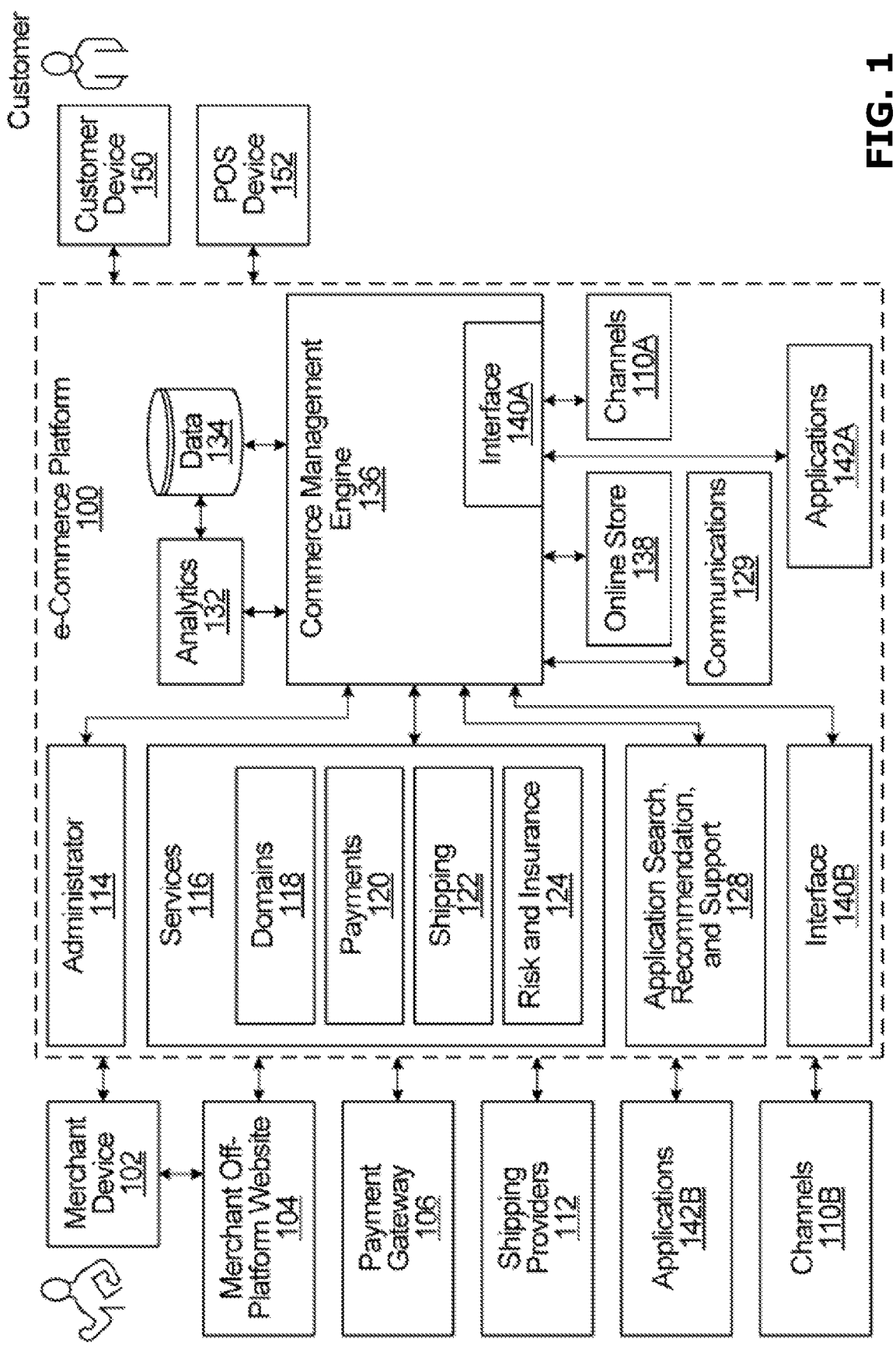
FIG. 1 is a block diagram of an example e-commerce platform, in which examples described herein may be implemented.
Figure 3:
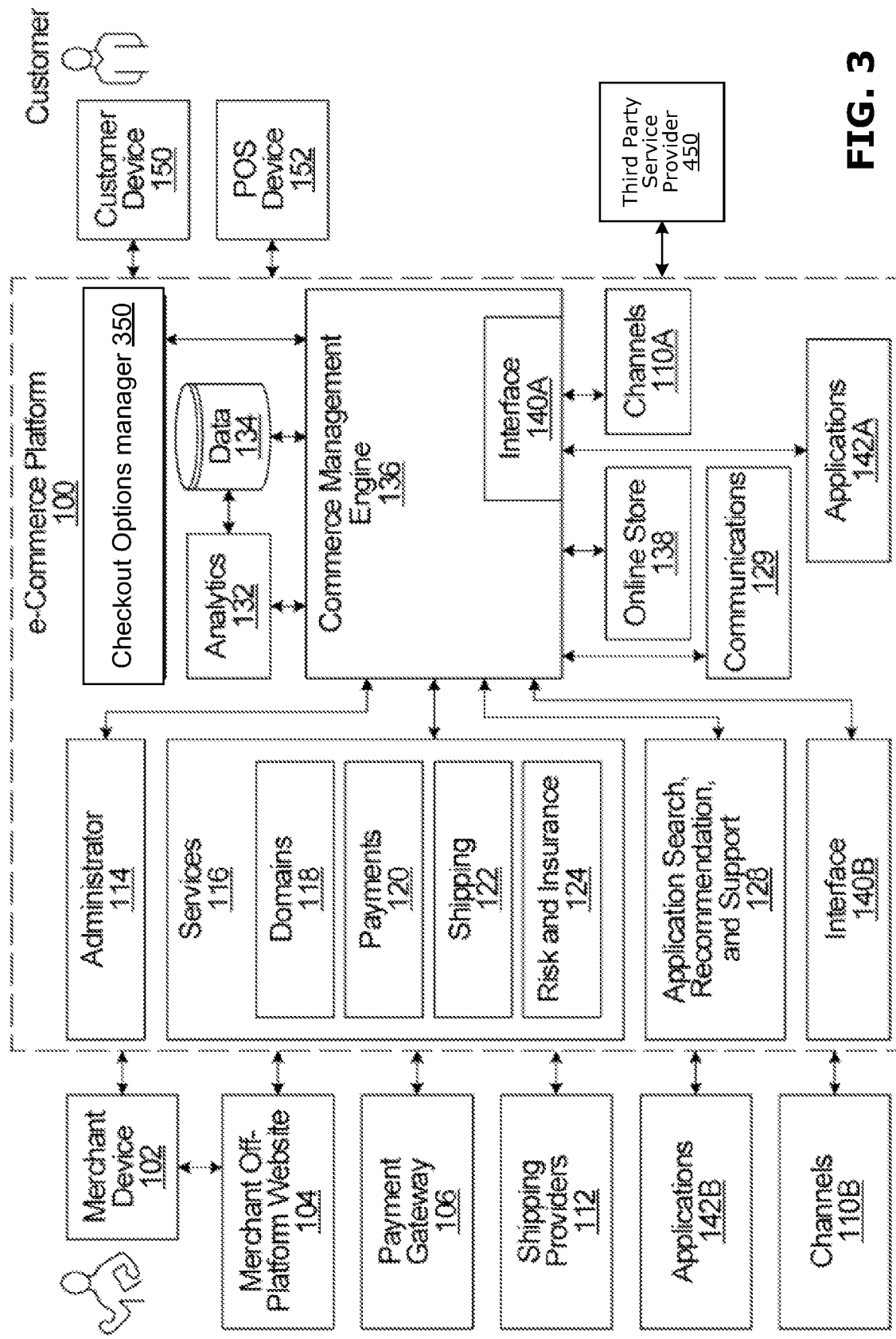
FIG. 3 is another block diagram of the e-commerce platform of FIG. 1, showing some details related to application development.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, and games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfilment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfilment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfilment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfilment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfilment component of the commerce management engine 136. The fulfilment component may group the line items of the order into a logical fulfilment unit of work based on an inventory location and fulfilment service. The merchant may review, adjust the unit of work, and trigger the relevant fulfilment services, such as through a manual fulfilment service (e.g., at merchant managed locations) used when the merchant picks and packs the products in a box, purchase a shipping label and input its tracking number, or just mark the item as fulfilled. Alternatively, an API fulfilment service may trigger a third-party application or service to create a fulfilment record for a third-party fulfilment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 4:
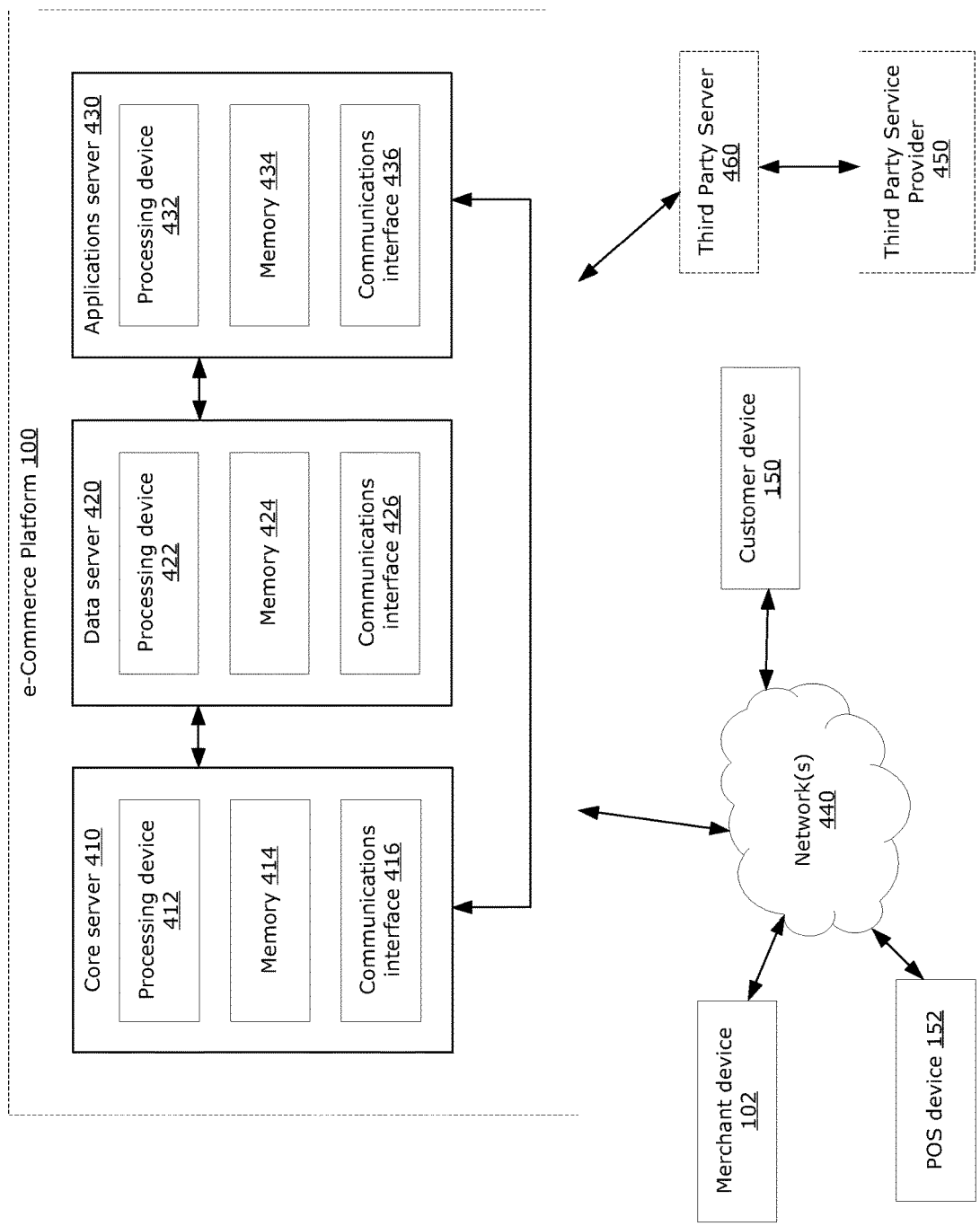
FIG. 4 is a block diagram illustrating an example implementation of the e-commerce platform of FIG. 1.

FIG. 4 is a block diagram of an example hardware configuration of the e-commerce platform 100 in communication with a third-party service provider 450 via a remote third-party server 460 (discussed further below) for implementing a checkout component.

It should be noted that different components of the e-commerce platform 100 (e.g., the data facility 134, analytics 132, commerce management engine 136 and applications 142A-B) may be implemented in separate hardware or software components, on a common hardware component or server or configured as a common (integrated) service or engine in the e-commerce platform 100. In the example of FIG. 4, the e-commerce platform 100 includes a core server 410, a data server 420 and an applications server 430, which are each in communication with each other (e.g., via wired connections and/or via wireless intranet connections). Each of the servers 410, 420, 430 include a respective processing device 412, 422, 432 (each of which may be, for example, a microprocessor, graphical processing unit, digital signal processor or other computational element), a respective memory 414, 424, 434 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 416, 426, 436 (each of which may include transmitter, receiver and/or transceiver for wired and/or wireless communications). The core server 410 may store instructions and perform operations relevant to core capabilities of the e-commerce platform, such as providing the administrator 114, analytics 132, core commerce facility 136, services 116 and/or financial facility 130, among others. The data server 420 may be used to implement the data facility 134, among others. The applications server 430 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 440 (e.g., wired and/or wireless networks, including a virtual private network (VPN), the Internet, and the like).

As noted above, during a checkout transaction, a customer may be provided with selectable options for different categories of the transaction, such as selecting a shipping option, selecting a payment plan, applying a rewards discount, among other possibilities. Many of these services may be delivered by a third-party service provider 450 and, thus, require external calls (such as API calls) out to the external third-party server 460 of the third-party service provider 450. Such external calls at checkout typically require a round-trip request-and-response. They may be made directly to third-party service provider 450, or through a third party application that the merchant may have installed in their online store to manage checkout options. The third-party application is often hosted at third-party server 460 that is located at a remote and/or geographically-disparate location from servers 410, 420, 430.

Although FIG. 4 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 414, 424, 434 may be replaced with external storage or cloud-based storage, among other possible modifications.

Figure 5:
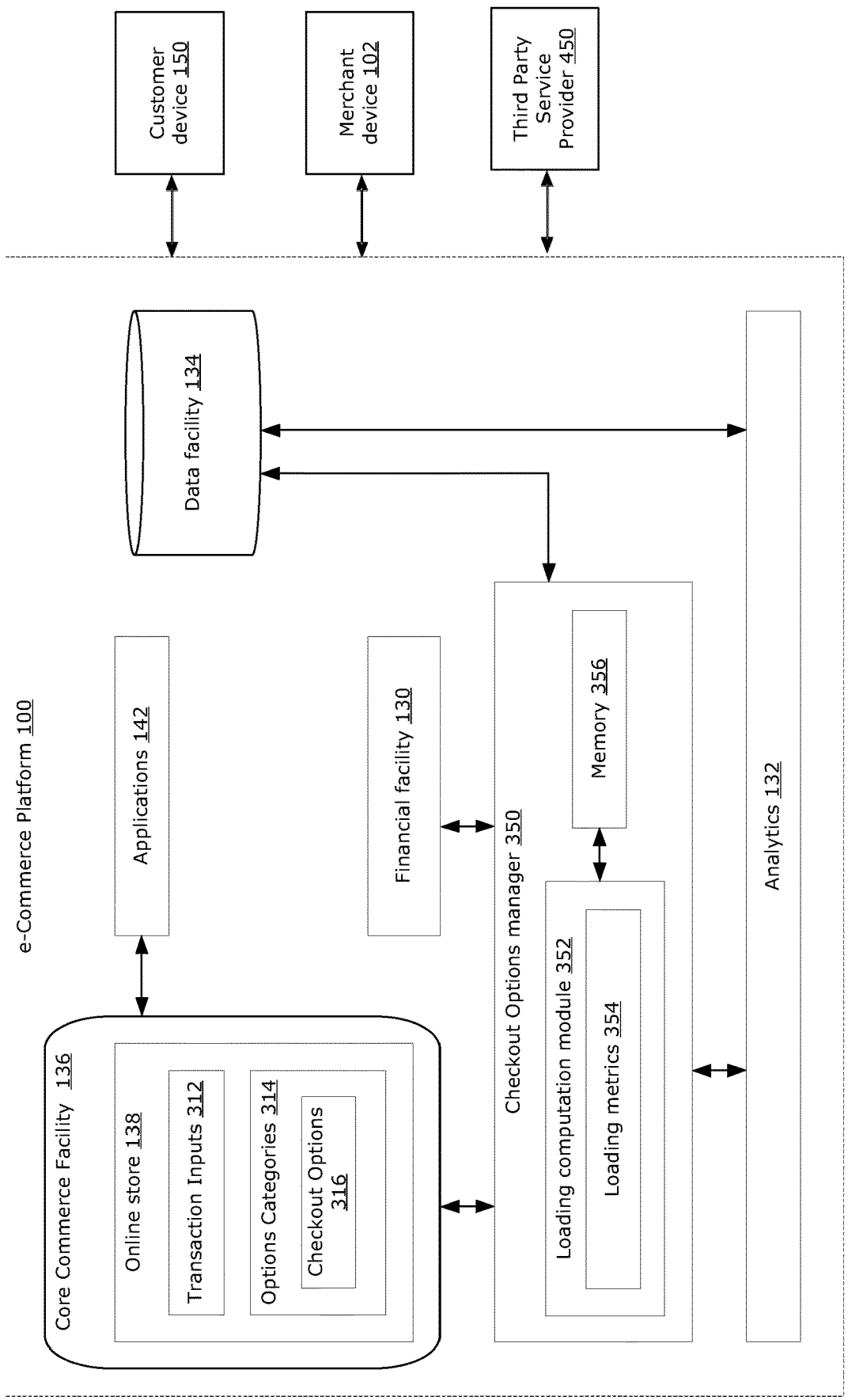
FIG. 5 is another block diagram of the e-commerce platform of FIG. 1, showing some details related to progressive loading of checkout options.

FIG. 5 is another depiction of the e-commerce platform 100 that omits some details that have been described with reference to FIG. 1, and shows further details discussed below. In particular, FIG. 5 illustrates some example details of the e-commerce platform 100 that are relevant to providing progressive loading of checkout options and enabling completion of the checkout process even when some/all of the checkout options, from third-party service providers for example, have not yet loaded.

FIG. 5 illustrates a single instance of an online store 138 for simplicity. However, it should be understood that there may be multiple online stores 138 on the e-commerce platform 100, each with a checkout transaction process. The checkout transaction process of online store 138 is associated with transaction inputs 312 and one or more options categories 314.

Each options category 314 may be related to an aspect or category of the checkout transaction that can only be determined or populated at the time of checkout, i.e., they cannot be preloaded. For example, options category 314 may relate to shipping, payment instalments, discounts, a reward system, subscriptions, customs and duties, among other possibilities. In that regard, each of the options categories 314 have associated with it a set of checkout options 316 that the user may or must select as part of the checkout process, in order to complete the transaction. Checkout options 316 cannot be preloaded because the checkout options require customer-specific and/or purchase-specific information before they can be determined.

The customer-specific and purchase-specific information make up transaction inputs 312. For example, if the options category relates to shipping, the customer-specific input may be a shipping address, and the purchase-specific input may be the value of the customer's cart, and the size and weight of the package. If the options category 314 relates to a membership rewards program, the customer-specific input may be the customer's membership number, and the purchase-specific input may be the category of items in the customer's cart (i.e. a rewards item or a regular item).

The e-commerce platform 100 further includes a checkout options manager 350 in communication with the online store 138. Generally, if a checkout transaction involves an options categories 314, selection of one of the checkout options 316 under that options category 314 is required to complete that checkout transaction. Thus, as described in further detail below, the checkout options manager 350 is configured to identify and/or determine which of a collection of checkout options (for a given options category 314) belong at least to a first set/segment/group of checkout options, and which of the collection of checkout options belong at least to a second set/segment/group of checkout options. The checkout options manager 350 is then configured to update a checkout UI, which is communicated to cause the user device 150 to display or provide the first and second sets of checkout options differently to the user, such as at different times (i.e. progressively).

For example, the first set may be checkout options that are able to load quickly enough to be shown immediately, or with a short defined delay, to the customer (such as flat rates via local database lookup), and the second set may be checkout options are slower to load/too slow to qualify under the first set (such as API calls to third parties for dynamic shipping rates). The second set of checkout options may be delay loaded. For example, the second group of (slower) checkout options can be hidden from display, and may only be displayed after the customer selects a selectable user interface element (e.g. an expander or spinner) in the checkout UI. However, checkout options manager 350 enables the e-commerce platform 100 to complete the checkout transaction using one of the first group of (faster) checkout options, even when the second group of (slower) checkout options have not loaded (and thus not displayed and not available for selection in the checkout UI). In that manner, the checkout options manager 350 allows the e-commerce platform 100 to complete the checkout process even when all of the checkout options 316 (such as from third-party service providers 350) have not yet been received from third-party servers or displayed on the customer device 150.

An example checkout transaction using checkout options manager 350 is now described. Checkout options manager 350 is initially activated by a trigger event, which is typically a customer input entered in/at the customer device 150 and communicated over a network to the e-commerce platform 100. The trigger event may be receiving a shipping address during the checkout process, initialization of the checkout user interface, or the customer's selection on the user interface to enable a certain category of options, among other possibilities.

After the trigger event is detected, checkout options manager 350 automatically makes queries to populate the checkout options 316 for each of the options categories 314 involved. For example, in the case when the options category 314 is related to shipping, the trigger event may be receiving the customer's shipping address. The shipping rate requests/queries are then automatically dispatched by checkout options manager 350 based on the transaction inputs 312 (e.g. the value of the cart, the location of the shipping address, and the size and weight of the package, etc.)

As noted above, the checkout options 316 are dependent on such customer-specific and purchase-specific information and, therefore, cannot be determined ahead of time. The options category 314 may relate to one or more of shipping, payment instalments, discounts, a reward system, subscriptions, customs and duties, among other possibilities.

Checkout options manager 350 may be configured to dispatch the requests/queries to local and remote sources. For example, checkout options manager 350 may query the local data facility 134/analytics 132 and query remote third-party service providers 450 (optionally through the third-party server 460) for the checkout options 316.

For local queries, the checkout options manager 350 may have access to information from the analytics 132 and data facility 134 of the e-commerce platform 100. The analytics 132 and data facility 134 may include, for example, databases with static rates or checkout options for options categories that do not change over time. For the options category related to shipping, the database could contain flat shipping rates or free shipping checkout options that are conditional upon certain purchase requirements being met, for example.

The analytics 132 and data facility 134 may also include information about customers (e.g., stored in customer profiles), information about customers' purchase habits (e.g., purchase information aggregated by customer group, aggregated by time period, etc.), information about customers' browsing habits (e.g., browsing information aggregated by customer group, aggregated by time period, etc.), information about sales (e.g., sales information aggregated by product category, aggregated by time period, aggregated by geography, etc.), among others. Information about customers may be used to define customer groups. For example, a customer group may be defined by a common characteristic such as a common gender, a common age group, a common geographic area, a common living arrangement, a common purchase history, a common browsing history, a common interest (whether explicitly indicated in a customer profile or implicitly indicated in purchase or browsing history), and combinations thereof, among other possibilities. Of course, it is recognized that such databases may be stored remotely rather than locally from e-commerce platform 100.

For external queries to third-party service providers 450, responses to such queries typically require a round-trip, request-and-response from an application hosted at the remote third-party server 460. An example in the shipping scenario is an API call to a shipping carrier for dynamic shipping rates. The external queries could also be made directly to third-party service providers 450. As noted above, the speed of such external calls may be dependent on the level of technology infrastructure, server speeds, and network connection speeds provided by the third parties and/or the connectivity providers. Thus, delays in such external calls may be largely caused by delays in the third-party service providers themselves.

Typically, in existing conventional online checkouts, after responses to all of the requests/queries are received, the full set of checkout options from both local and external queries are simultaneously displayed to the customer on the user interface in a dropdown menu or other form of list (e.g. a set of radio buttons, or a sequence of cards/sections). However, in the present disclosure, checkout options manager 350 is configured to instruct the user interface on the customer device 150 to display each of the checkout options 316 depending on whether they are identified or determined to be in the first set (e.g. quick-loading set) or the second set (e.g. slow-loading set) of checkout options.

To that end, checkout options manager 350 is configured to identify and/or dynamically determine whether each checkout option 316 should belong to the first set of options or to the second set of options based on the response time of the queries, using a loading speed computation module 352. In some examples, the first set of options may be "quick-loading" options and the second set of options may be "slow-loading" or "delay loaded" options. It is understood that the expressions "quick-loading options" and "slow-loading options" are relative terms, where a checkout option 316 may be identified as "quick-loading" when it loads (i.e. a response to the query is received) within a predefined time threshold, or faster than another checkout option 316 that loads slower or is delay loaded, as discussed further below.

Loading computation module 352 identifies or determines whether each checkout option 316 is part of the first set of options (e.g. "quick-loading") or part of the second set of options (e.g. "slow-loading" or "delay loaded") based on one or more loading metrics 354. These loading metrics 354 are hard or dynamic rules applied to the queries by loading computation module 352 to determine whether each checkout option 316 belongs in the first set of options or the second set of options (such as "quick-loading" or "slow-loading" checkout options). The metrics may be: a static threshold cut-off time (e.g. response time of the query must be under 500 ms in order to be included in the first set of options), empirical measurements (e.g. the cut-off time is set based on historical or recent response times of similar queries), statistical analysis of the empirical measurements (e.g., the cut-off time is set based on a cut-off point in a distribution such as, for example, the one or two response times where the response times are substantially normally distributed), analysis of the loading calls (e.g. whether the queries are conducted using first party calls, third party calls, or database lookups), network analysis (e.g. the cut-off time is set based on current or predicted load on first or third party networks, or customer networks), heuristics based on domain knowledge (e.g. all flat-rates are included in the first set of options, while all dynamic rates are included in the second set of options), and customer configurations (e.g. the merchant themselves or the e-commerce platform 100 indicates to the checkout options manager 350 which rates belong to the first set of options and which rates belong to the second set of options). Notably, the loading metrics 354 may include rules that are dynamically variable dependent on the status of computing resources at the e-commerce platform 100. For example, if there is currently a high usage of computing resources or network resources (e.g. high usage of network bandwidth, high network congestion, high usage of memory resources, etc.) the threshold cut-off time may be dynamically lowered (e.g. only responses that arrive within 300 ms are included in the first set of options) to reduce further usage of computing/network resources. Thus, the options that are delay loaded may change; the options that belong to the first set and the options that belong to the second set are not necessarily fixed.

In some examples, the e-commerce platform 100 may have information ahead of time about the relative speeds of various third-party service providers' APIs (e.g. based on historical measurements). Then based on the service providers for the checkout options 316 (which may be selected by a merchant), checkout options manager 350 can define the cut-off time (e.g., based on a statistical analysis of the relative speeds of the selected providers).

The data and information used by the loading computation module 352, such as the empirical measurements, historical or recent response times of similar queries, usage of computing/network resources, relative speeds of the selected providers etc., may be stored in a dedicated memory 356, and/or in data facility 134.

When the first set of options have been identified by the checkout options manager 350, the checkout options manager 350 is configured to send an indication to the remote client device 150 to update the user interface to automatically display (either immediately after the trigger event, or with a short fixed delay) at least one option from the first set of options. The first set of options may be identified by the checkout options manager 350 following receipt of a reply to one or more of the requests/queries associated with the first set of options. Notably, this display of at least one of the first set of options occurs prior to display of any of the options from the second set of options.

The checkout options manager 350 is further configured to send an indication to the remote client device 150 to update the user interface to automatically display a selectable user interface element (such as an expander icon or chevron symbol) with the at least one option from the first set of options. Any or all of the options from the second set of options may be delay loaded, and are hidden from display on the client device 150 prior to selection of the selectable user interface element.

In some examples, checkout options manager 350 may be configured to send an indication to the remote client device 150 to update the user interface to automatically display all options from the first set of options at once. For example, all fixed-rate shipping options may be displayed at the same time on the checkout page as the first set of options (e.g. replacing a skeleton UI element), where each fixed-rate option from the first set of options is displayed with a radio button for the customer to select. If all of the options from the first set of options do not load at the same time, waiting for all of the first set of options to load may delay display of the page, or a section of the page, for a short period of time before rendering. In other words, loading of other UI elements (such as page load, section load) may be obscured (i.e., not displayed) for the customer until all of the first set of options are loaded.

In cases where more than one option of the first set of options are first made visible to the customer on customer device 150, checkout options manager 350 may be further configured to rank the options in the first set of options based on a checkout criterion or a preselected order for display on customer device 150. For example, the preselected order may be a ranking based on price, with the cheapest option being displayed at the top of the list. When the options category 314 is shipping, the options in the first set of options may alternatively be ranked and displayed based on the delivery times, or the merchant's predetermined preferred shipping carrier. Other ranking systems include ranking based on the call speeds, customer's specific historical preferences, likelihood of use, overall popularity, or having the best interest rates, among other possibilities. Such ranking could also depend on a combination of factors (e.g., primary sort order, secondary sort order, etc.)

In other examples, checkout options manager 350 may be configured to send an indication to the remote client device 150 to update the user interface to automatically display only one option from the first set of options on customer device 150. For example, if checkout options manager 350 identifies three checkout options to be available from the first set of options, the cheapest checkout option may be shown as the selected (visible) default option in the dropdown. The other two checkout options may not be visible within the dropdown until the selectable user interface element (e.g. dropdown/expander button) is selected or clicked-on by the customer at the client device 150. At that point, the two additional checkout options from the first set of options would be made visible, but with no loading indicator, since they are already loaded.

The display of at least one option from the first set of options occurs prior to display of any options from the second set of options. Moreover, display of at least one option from the first set of options may occur prior to checkout options manager 350 even having received replies/answers to one or more of the queries for the second set of options.

As noted above, conventional online checkout transactions typically present the customer with a loading cursor on the user interface to indicate that options are pending during a checkout transaction. At such a time, the customer encounters a delay because the transaction cannot be completed until all of the checkout options are loaded. Customers are also inclined to wait when they see a loading cursor, perceiving that the page has not fully loaded and that the checkout transaction cannot proceed yet. Customers are also inclined to wait because they wish to see the additional pending options that are indicated to be displayed.

To that end, checkout options manager 350 is configured to immediately (or with a short fixed delay) provide the customer with at least one of the first set of options (such as one of the quick-loading options) displayed on the user interface with a selectable user interface element (such as an expander), but without providing or displaying a loading cursor or any of the second set of options (such as the slow-loading or delay loaded options). Checkout options manager 350 is further configured to send an indication to the remote client device 150 to hide the loading cursor and the second set of options (such as the slow-loading or delay loaded options) behind the expander on the user interface.

While the checkout transaction may be completed with any one of the first set of options (such with as any one of the quick-loading options), the at least one of the of the first set of options that is made visible to the customer on the client device 150 may be pre-selected as a default option without requiring any further customer interaction.

In cases where more than one option from the first set of options are made visible to the customer on customer device 150, checkout options manager 350 may automatically assign one option of the first set of options to be the default option. For example, if the first set of options have been ranked based on price, the cheapest option displayed at the top of the list may be selected as the default option. In cases where only one option of the first set of options is made visible to the customer on customer device 150, checkout options manager 350 may automatically assign the one displayed option from the first set of options to be the default option without requiring any further customer interaction.

In cases where multiple options in the first set of checkout options are displayed, it may take some time for the customer to compare all of the features of the multiple options. Thus for multiple options, checkout options manager 350 may further be optionally configured to identify/determine which of the loaded options from the first set of options is the cheapest, has the fastest delivery time, or is the most popular, among other factors, and automatically highlight that option on the list. The option may be highlighted with a different font or background colour, or labelled/badged as "Fastest", "Cheapest", "Most Popular" etc.

The present checkout options manager 350 is configured to allow/enable completion of the checkout transaction using one of the options from the first set of checkout options, even when it has not received responses from respective queries for any or all of the second set of options. Thus, checkout options manager 350 enables completion of the checkout transaction using the at least one of the options from the first set of options (such as the quick-loading options) displayed on the user interface, by sending an indication to the client device 150 that the customer can proceed with the checkout transaction (e.g. enabling the customer to select an option to complete the checkout), even when the second set of options (such as the slow-loading options) have not loaded.

After the second set of options have been identified by checkout options manager 350 based on the queries, the loading of the second set of options is hidden on the user interface. If the second set of options are still loading, checkout options manager 350 is configured to update the checkout user interface to display a loading indicator (e.g. the loading cursor/spinner) only when the customer selects the selectable user interface element (e.g. an expander button or a chevron) on the checkout user interface.

Regardless of whether the user interface element is selected by the customer or not, the checkout options manager 350 makes queries for the second set of options at the same time as the queries are made for the first set of options. In this manner, no indication of loading is immediately visible to the customer on the checkout user interface. The user interface element may be an expander for a dropdown menu, or an expandable section (e.g. selectable with a chevron), among other possible user interface options.

If the user interface element is selected, and the second set of options are still loading (i.e. not all responses for the second set of options have been received), the customer is shown a loading cursor (such as the spinner) on the user interface until all of the options in the second set of options become available. At that point, the checkout options manager 350 is configured to send an update to the client device 150 to update the user interface by replacing the spinner with the now-loaded second set of options. For example, if the dynamic shipping rates are determined to be options in the second set of options (such as slow-load options), the customer will only ever see the dynamic shipping rates if they interact with the user interface element.

If the user interface element is selected by the customer after a period of time, and the second set of options have already been loaded (i.e. all responses for the second set of options have been received), the checkout options manager 350 may be configured to send an update to the client device 150 to update the user interface to display all of the second set of options without the loading cursor/spinner.

Alternatively, the checkout options manager 350 may be configured to send an update to the client device 150 to update the user interface to automatically replace the user interface element on the checkout page with the second set of options themselves after they have loaded. For example, if the customer waits to click on the user interface element, and the second set of options have now all loaded, the second set of options may immediately and automatically be displayed as additional radio buttons in the shipping option list and the user interface element would no longer be displayed.

If there are multiple options in the second set of options, once loaded, the checkout options manager 350 may also be configured to rank the loaded multiple options in the second set of options and send an update to the client device 150 to update the user interface to display the second set of options based on price, delivery times, historical customer preference, or predefined merchant preferences, likelihood of use, among other possibilities.

In some examples, once the second set of checkout options are loaded, their corresponding features (such as prices and delivery times) may be more preferred (i.e. lower or faster) than the displayed first set of checkout options. In such cases, all of the checkout options may be automatically rearranged/re-ranked such that the newest cheapest (or fastest or most merchant preferred or fulfilment network preferred etc.) option is displayed first in the list of checkout options. Alternatively, if the checkout options are "badged" as described above, rather than rearranging the entire list, just the badges or highlighting can be moved to the newest cheapest/fastest checkout option.

In other examples, if the customer does not selects/clicks-on the user interface element, even if one option of the second set of options turns out to be more preferable than the displayed first set of checkout options, the more preferable option in the second set of options may not be displayed in the user interface.

Optionally then, checkout options manager 350 may also be configured to send an update to the client device 150 to update the user interface to provide a notification to the customer of a new more preferable checkout option, whether or not the customer has selected the user interface element to view the additional checkout options.

Thus far, the checkout options manager 350 has been described as being configured to identify and update the user interface to display the checkout options in two batches/sets, such as quick-load options and slow-load or delay loaded options. However, checkout options manager 350 may optionally be configured to segment the checkout options into more than two sets/batches, such three sets (e.g. as a quick-load batch, a faster slow-load batch, and a slower slow-load batch). For example, the first (such as quick-load) set/batch may be made immediately available for display, the second (such as faster slow-load) set/batch may be made available for display after a first amount of time, and the third (such as slower slow-load) set/batch may be made available for display after a second amount of time, where the second amount of time is greater than the first amount of time.

For example, in response to selection of the user interface element, the checkout options manager 350 may send an update to the client device 150 to update the user interface to display any remaining options from the first set of options and display the second set of options after receiving responses from respective queries for the second set of options, prior to displaying the third set of options. The checkout options manager 350 may further send an update to the client device 150 to update the user interface to display a loading indicator for the third set of options when responses from the respective queries have not all been received or display the third set of options for which responses from the respective queries have all been received.

In another example, the first amount of time may be the amount of time the customer takes to select the user interface element. In such a case, if the user interface element is selected, any options that have been loaded are displayed as options in the second set of options (such as faster slow-load options). The options that are still loading may be considered options in the third set of options (such as slower slow-load options), and the customer may be shown the second set of options (faster slow-load options) and a loading cursor (such as the spinner) until the third set of options (slower slow-loading options) become available. At that point, the spinner may be replaced with the third set of options.

Figure 6:
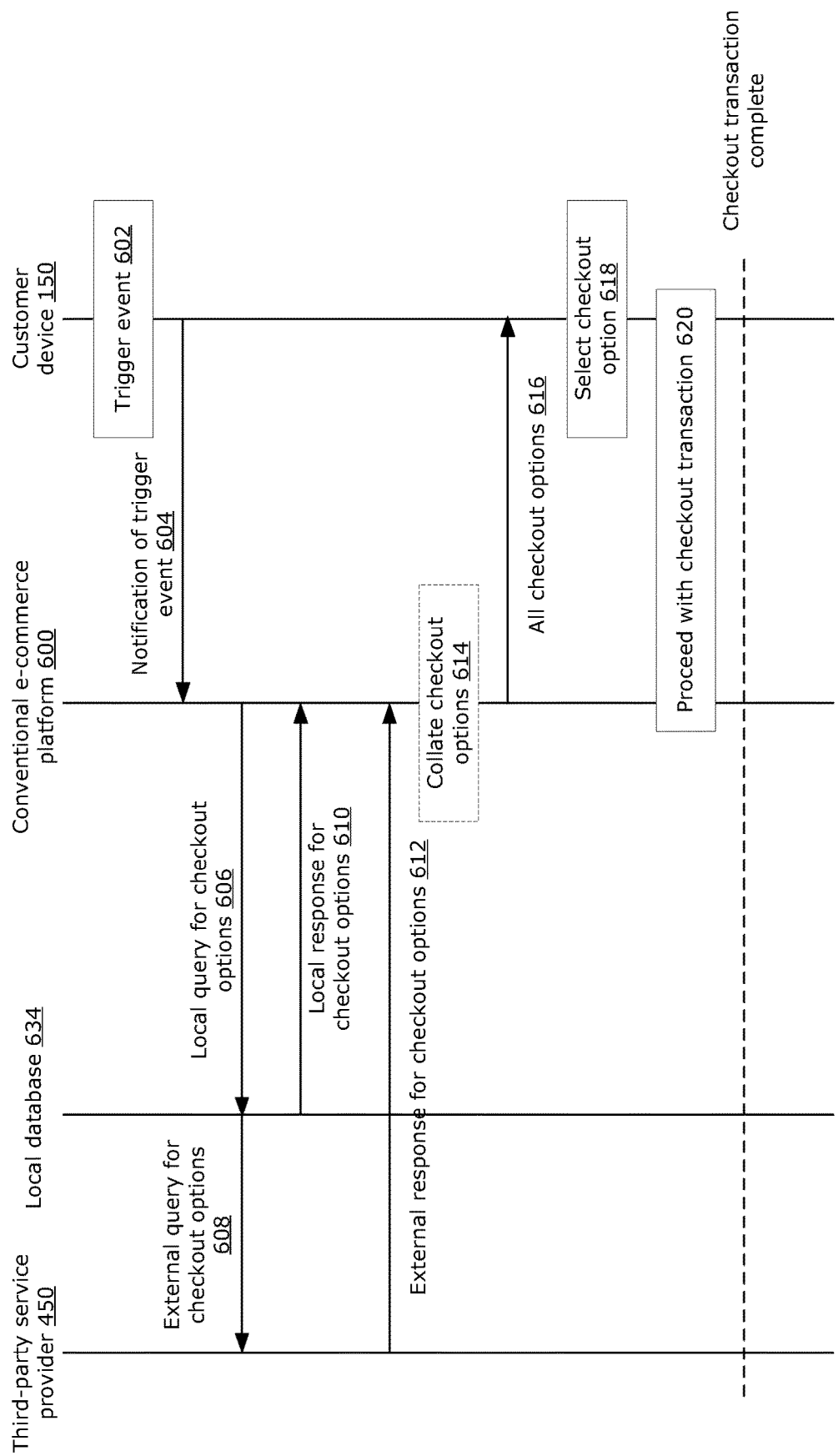
FIG. 6 is a signaling diagram illustrating example communications between a user device and a conventional e-commerce platform during a typical checkout transaction.

FIG. 6 is a signalling diagram illustrating example communications between a conventional e-commerce platform 600 with a local database 634, a customer device 150, and a third-party service provider 450. Following notification 604 of a trigger event 602 or request(s) from the customer device, the conventional e-commerce platform 600 typically sends queries to internal databases 606 and/or to remote third-party service providers 608 for checkout options. After answers (including local response 610 and external response 612) to all of the requests/queries are received, the full set of checkout options from both local and external queries may be collated 614 and sent 616 to the customer device 150 for simultaneous display on the user interface. After the customer selects 618 one of the checkout options at the customer device 150, the conventional e-commerce platform 600 proceeds with the checkout transaction via the user interface on the customer device 620, and the transaction is completed. As noted above, however, waiting for responses to all of the requests/queries before enabling completion of the checkout transaction can result in customer confusion, undesirable delay to completion of the checkout transaction, and a waste of computer resources to load unnecessary checkout options.

Figure 7:
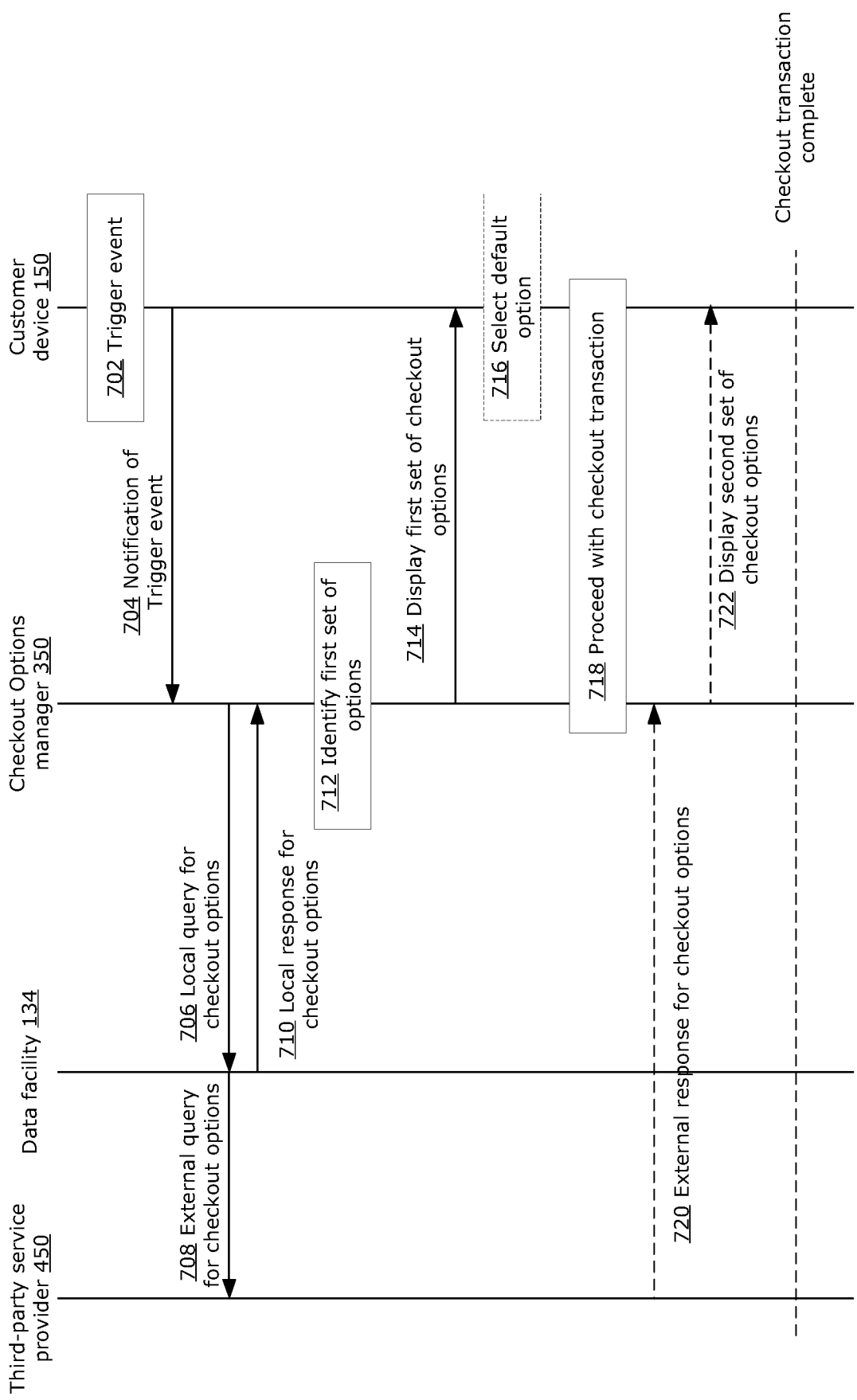
FIG. 7 is a signaling diagram illustrating example communications between a user device and the checkout options manager during a checkout transaction, for enabling progressive loading of checkout options, in accordance with examples of the present disclosure.

Thus, FIG. 7 is a signalling diagram illustrating example communications between the checkout options manager 350, customer device 150, and third-party service provider 450, in accordance with examples of the present disclosure. The checkout options manager 350 may be implemented on the e-commerce platform 100 (e.g., in a server of the e-commerce platform 100), or outside of the e-commerce platform 100 (e.g., in a third-party server, in the customer device 150, or in the merchant device 102), or a combination thereof. For example, the checkout options manager 350 may be implemented by an online checkout service, which may not be part of the e-commerce platform 100. The following discussion is in the context of an example in which the checkout options manager 350 is implemented in a server of the e-commerce platform 100.

At 702, a trigger event is entered or detected at the customer device 150. For example, a shipping address may be entered by the customer at the customer device 150. Once the trigger event is detected, a notification is automatically sent by customer device 150 to the checkout options manager 350 at 704.

In response to the trigger event notification, the checkout options manager 350 dispatches all queries to populate the checkout options. Such queries include both local queries for checkout options at 706 (for example, requests to internal databases stored in data facility 134 of e-commerce platform 100), and external queries for checkout options at 708 (for example, requests to third-party service provides 450, optionally via the third-party's server 460).

At 710, the local data facility 134 responds to its request with locally sourced checkout options. At 712 then, checkout options manager 350 may identify the local responses to be part of a first or second set of checkout options (such as quick-load or slow-load responses). In some scenarios, because the local response at 710 is internal to e-commerce platform 100, the local response(s) may be provided to checkout options manager 350 immediately or with very little delay. In such a case, after applying loading metrics 354, checkout options manager 350 may identify one or more of the local response(s) as a first set of options (such as quick-loading options).

At 714, having identified at least one option of the first set of options, the checkout options manager 350 then immediately sends a signal to the customer device 150 to display the at least one option of the first set of checkout options. With the at least one of the first set of options displayed, the customer device 150 may automatically select one of the first set of options as a default option at 716. In any case, checkout options manager 350 can proceed with the checkout process at 718 with just the option from the first set of options (such as one of the quick-loading options).

In contrast to the conventional signalling diagram of FIG. 6, completion of the checkout process at 718 can proceed without checkout options manager 350 receiving external response(s) from the third-party service providers 450 at 720, and/or without the second set of options being displayed at the customer device 150 at 722. Of course, in another example, the checkout process at 718 can also occur after checkout options manager 350 receives external response(s) from the third-party service providers 450 at 720 (thus providing time for delayed loading of the second set of options), and after the second set of options are displayed at the customer device 150 at 722.

FIG. 7 illustrates a signalling example where the local responses are determined by checkout options manager 350 to be the first set of options, while the external responses are determined to be the second set of options. However, the skilled person would understand that, in applying loading metrics 354 (discussed above), checkout options manager 350 could identify certain external responses to relate to options in the first set of options and identify certain local responses to relate to options in the second set of options instead. The notable feature is checkout options manager 350's ability to identify/determine which checkout options belong in the first set of options (such as quick-loading options) and which belong in the second set of options (such as slow-loading options), causing display of only at least one of the first set of checkout options first, and subsequently causing display of the second set of checkout options (e.g. after delayed loading and/or if requested by the customer), and yet enabling completion of the transaction without the second set of options being displayed or loaded.

Figure 8:
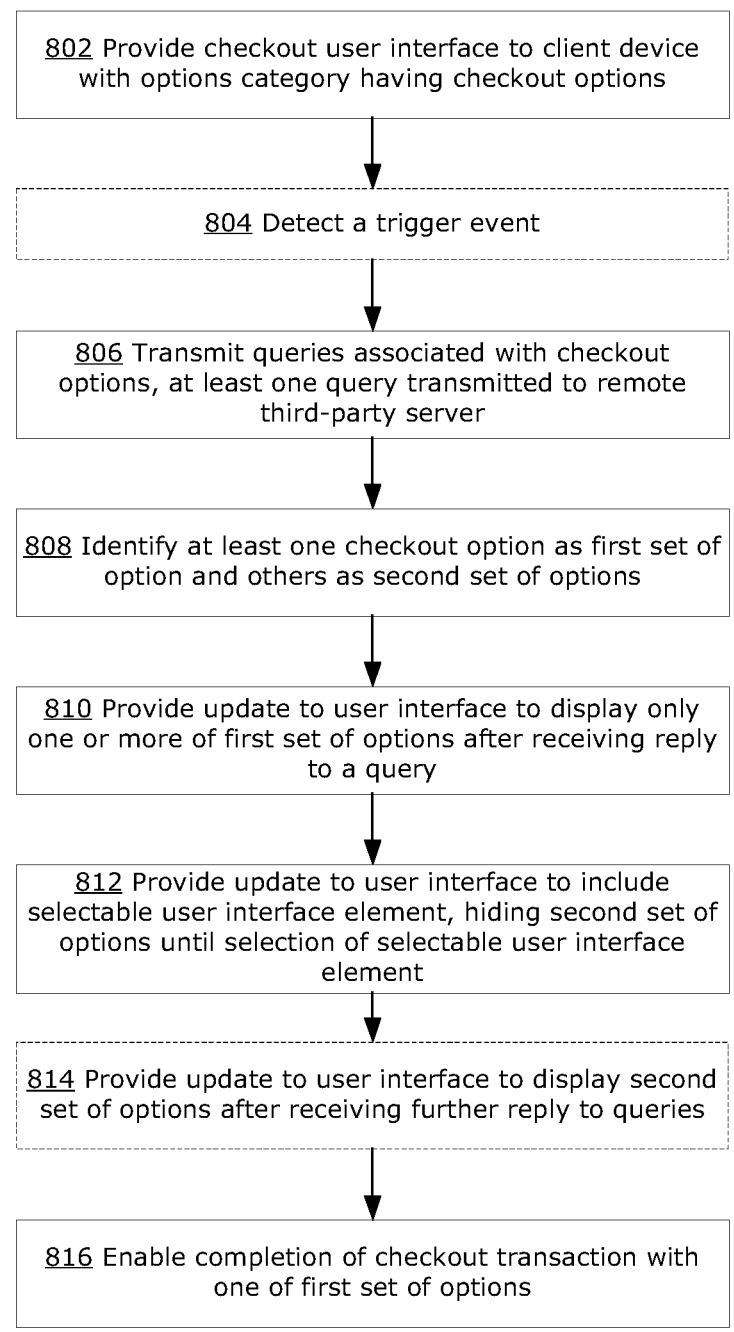
FIG. 8 is a flowchart illustrating an example method for progressive loading of checkout options, which may be implemented using the checkout options manager, in accordance with examples of the present disclosure.

FIG. 8 is a flowchart illustrating an example method 800 for completing a checkout transaction without all checkout options available. The example method 800 may be performed by the e-commerce platform 100 using the checkout options manager 350, for example. In particular, the method 800 may be performed in real-time (or near real-time) during a transaction process at a given online store 138 by a given customer.

At an operation 802, the checkout options manager 350 provides a checkout user interface to a remote client device 150 via a network 440 for completing a checkout transaction. The user interface includes at least one options category 314 which is associated with the checkout transaction. The options category 314 has an associated set of checkout options 316.

As noted above, each options category 314 may be related to an aspect or category of the checkout transaction that can only be determined or populated at the time of checkout, i.e., they cannot be preloaded. For example, options category 314 may relate to shipping, payment instalments, discounts, a reward system, subscriptions, customs and duties, among other possibilities. In that regard, each of the options categories 314 has associated with it a set of checkout options 316 that the user may or must select as part of the checkout process, in order to complete the transaction. Checkout options 316 cannot be preloaded because the checkout options require customer-specific and/or purchase-specific information before they can be determined.

Optionally at an operation 804, a trigger event is detected by the checkout options manager 350. Such a trigger event could be receipt of customer-specific information from the client device 150, such as receipt of a shipping address (e.g. inputted by a customer into the checkout user interface via the client device 150). The trigger event may alternately be detection that the user interface has been initialized at the client device 150, or receipt from the client device 150 of an indication of a selection on the user interface to enable a certain category of options, among other possibilities.

At an operation 806, requests or queries associated with the checkout options 316 are transmitted. At least one of the transmitted queries is transmitted (e.g., via the network 440) to a remote third-party server 460, where selection of one of the checkout options 316 is required to complete the checkout transaction.

At an operation 808, one or more of the checkout options 316 are identified as belonging to a first set of options (such as quick-loading options) and others of the checkout options 316 as belonging to a second set of options (such as slow-loading options). The checkout options 316 may be determined to belong to the first or second set of checkout options (such as quick-loading or slow-loading) based on a variety of different loading metrics 354. Examples of loading metrics 354 include a threshold cut-off time for receiving a response, historical measurements for receiving a response from similar queries, analysis of network communications and/or fulfilment network configurations related to each query, a merchant's configuration, dynamic cut-off time dependent on current usage of computer/network resources, among other possibilities. For example, when the loading metric 354 used is based on a threshold cut-off time for receiving a response, all responses received within 500 ms may be considered quick-loading, while all responses received after 500 ms may be considered slow-loading. Alternatively, the threshold cut-off time may be based on the corresponding customer's historical response times.

Thus, at an operation 810, an update to the user interface is communicated to the remote client device 150 to display at least one option of the first set of options after receipt of a reply to one or more of the requests, but prior to display of any of the second set of options. In that regard, the user interface is updated such that only one or more options from the first set of options are displayed.

At this point, the at least one option of the first set of options displayed may be automatically selected as a default option on the user interface.

At an operation 812, an update to the user interface is also communicated to the remote client device 150 to display a selectable user interface element, where all of the second set of options are hidden from display prior to selection of the selectable user interface element.

For example, in cases where the selectable user interface element has been selected at the remote client device 150, but the options in the second set of options have not yet loaded, the user interface may be updated to display any remaining options from the first set of options, and to display a loading indicator for the second set of options when responses from the respective queries have not all been received.

Optionally, at an operation 814, in cases where the second set of options have loaded (e.g., after a delay), the user interface may be further updated to display the second set of options after further receipt of replies to one or more of the respective requests.

However, regardless of whether the second set of options (e.g., delay loaded options) are displayed, at an operation 816, the checkout transaction is complete-able using one option of the first set of options (such as one of the quick-loading options) displayed on the user interface. The checkout transaction may be completed prior to receiving responses from respective queries for any or all of the second set of options (such as the slow-loading options). If a default option has been selected, in response to selection of the option to complete the checkout transaction, the checkout transaction may be completed using the default option without further interaction from the customer.

The above transaction process/method 800 may be implemented on e-commerce platform 100 and presented to the customer as a sequence of pages that the customer may navigate through. An example sequence of pages is illustrated in FIGS. 9A-9D.

Figure 9A:
FIGS. 9A-9D illustrate some example presentation formats for progressive loading of checkout options.

FIG. 9A shows a checkout user interface 900 displayed on a remote client device 150. The user interface 900 includes at least one options category 314 which is associated with the checkout transaction. In the shown embodiment, the options category 314 is shipping, identified with "Delivery" 902, and is associated with a set of checkout options 316 that are shipping options 904 (which have yet to be filled in in FIG. 9A). As shown in the present embodiment, the checkout user interface 900 has received the shipping address, also identified as the trigger event. At this point, since a shipping option 904 for shipping category 902 has not yet been provided or selected, the "Continue" button 906 is inactive (e.g. grayed-out). In other words, the checkout transaction cannot be completed yet.

Figure 9B:
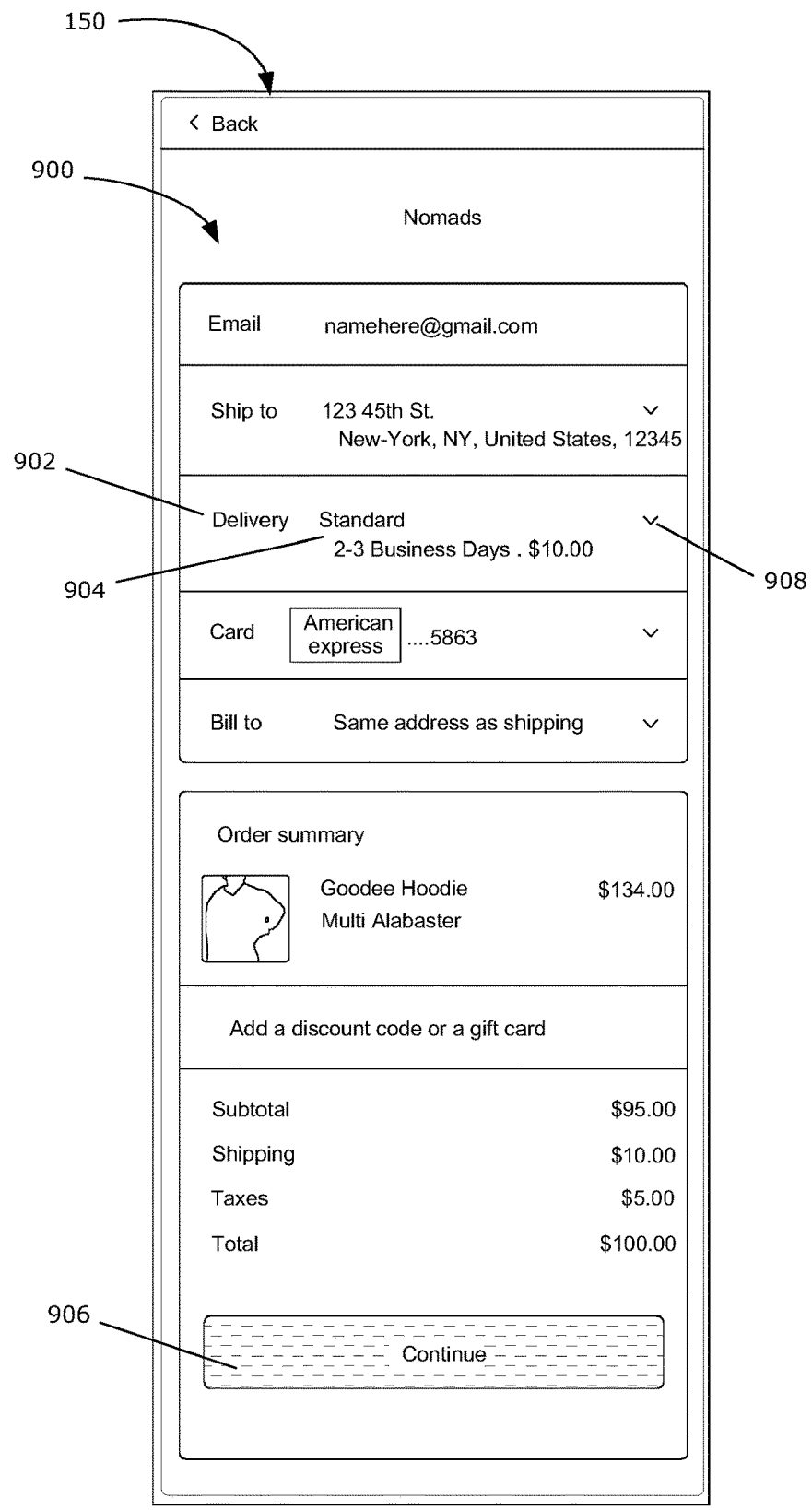

Upon detection of the trigger event (i.e. input of the shipping address), the checkout options manager 350 sends out shipping queries, where at least one of the shipping queries is sent to a third-party shipping carrier. In the present case, one of the shipping queries is also dispatched locally. The checkout options manager 350 identifies one of the shipping options as belonging to the first set of shipping options (such as quick-loading options), in this case, a flat-rate shipping option 904 that was determined based on a local database lookup. Thus, as shown in FIG. 9B, this flat-rate shipping option 904 is displayed immediately on the checkout user interface 900 with an expander/chevron 908 (i.e. a selectable user interface element). The flat-rate shipping option has also been automatically selected as the default option. Notably, any/all of the shipping options belonging to the second set of shipping options (such as slow-loading or delay loaded options) are initially hidden from display. Also notable is the fact that the "Continue" button 906 is now active (e.g. visually highlighted in a different color, as indicated by dashed lines in FIG. 9B) and the checkout transaction can be completed with the default flat-rate shipping option 904, even if the customer never selects the expander, and even if the second set of options have not loaded.

In other words, a customer may proceed through the checkout process with "incomplete" information (i.e. without loading information for all available options), since the transaction can be finished without the slow-to-fetch data options.

Figure 9C:
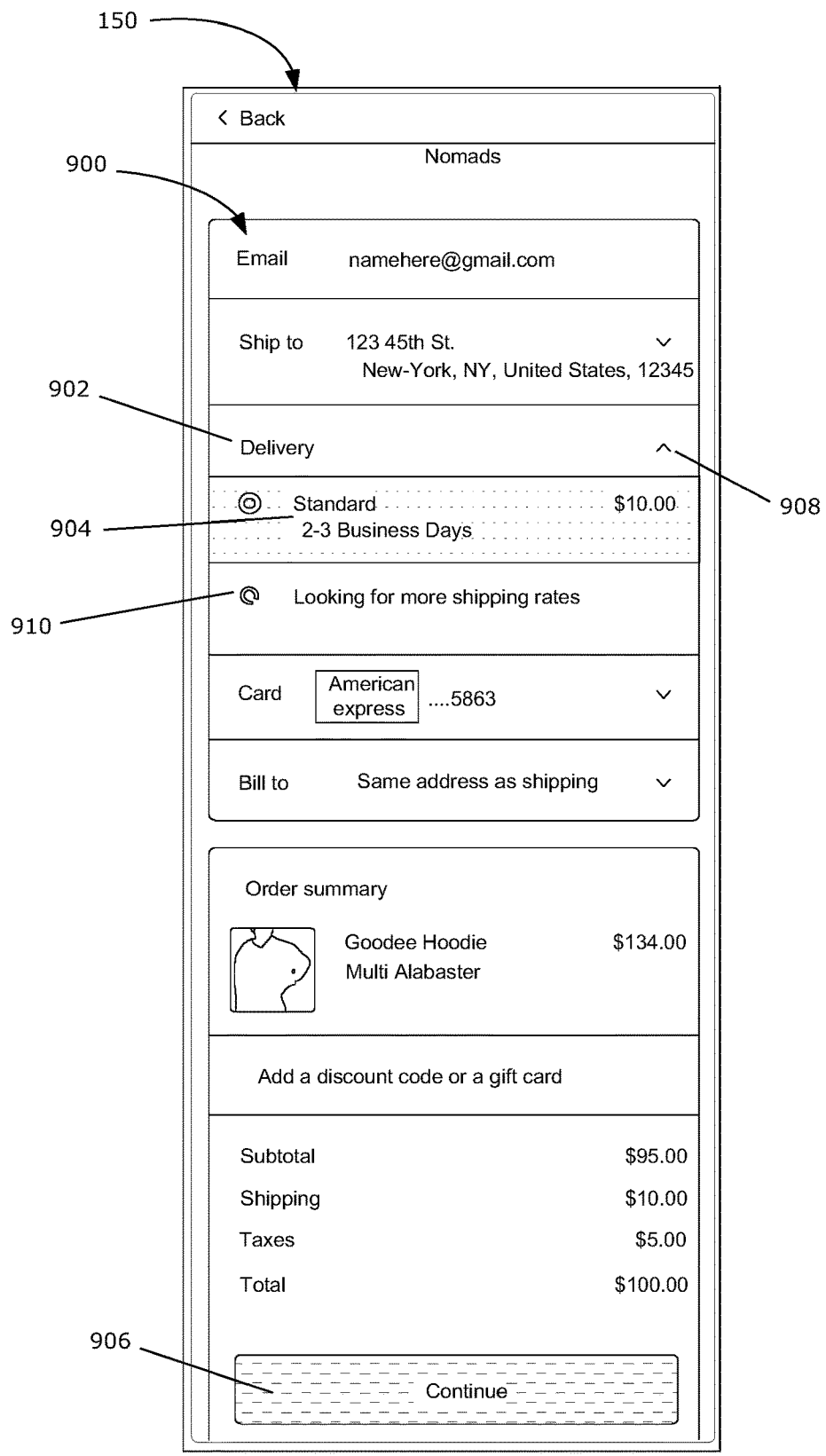

FIG. 9C illustrates an example when the expander/chevron is selected by the customer, but the second set of options have not yet loaded. In such a case, a spinner/loading cursor 910 is shown, indicating that the second set of options are still being loaded. As noted above, the "Continue" button 906 in FIG. 9C is still active and the checkout transaction can still be completed with the flat-rate shipping option 904, even though the second set of shipping options have not yet loaded.

Figure 9D:
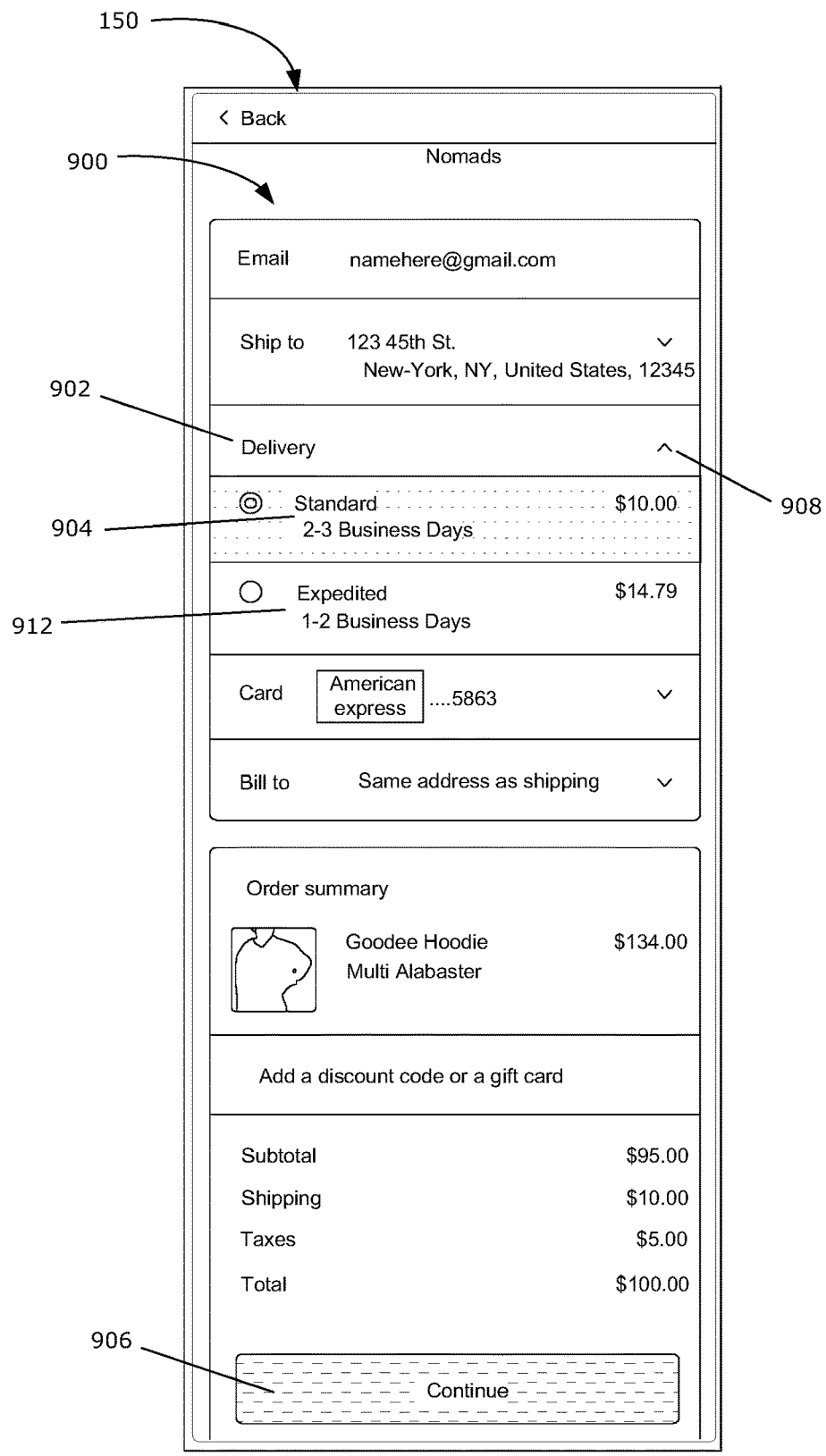

FIG. 9D further illustrates when the second set of shipping options (such as slow-loading or delay loaded options) have loaded. In such a case, a spinner/loading cursor 910 is replaced with a slow-loading shipping option 912. The customer now has the option of completing the transaction with either the option from the first set of options (such as the quick-loading flat-rate shipping option 904) or the slow-loading expedited shipping option 912 from the second set of options. However, all this time, the customer could have completed the transaction without being provided with the second set of options.

It bears noting that all queries to populate all of the checkout options (including the second set of/slow-loading/delay loaded checkout options and the first set of/checkout options, for example) are dispatched at the same time once the trigger event occurs, not when the expander/chevron is selected. Thus, the customer's interaction with the expander only appears to invoke calls to the second set of checkout options. However, as described above, those queries have already been dispatched at the earlier detection of the trigger event.

The customer's ability to complete the transaction using the (quick-loading) default option from the first set of options, even when some or all of the second set of options are not yet loaded or available, improves computer efficiency. The processing power, memory storage, and bandwidth that would otherwise be used to receive the response from the third-party calls, and to load and display all of the second set of checkout options on the checkout user interface, can now be used for other purposes. Thus, computer resources can be saved without hindering completion of the customer's checkout transaction.

As noted above, typical checkout user interfaces usually prevent the customer from completing a checkout transaction until all checkout options have been loaded and made available for selecting. According to the present disclosure, presenting the customer with at least one option from the first set of checkout options (such as one quick-load option) for each option category, allows the customer to finish the transaction even if some or all of the responses related to the options in the second set of options (such as the slow-load or delay loaded options) have not yet been received/loaded and displayed on the checkout user interface.

Further, from a customer-benefit perspective, the customer does not need to wait, nor would they be inclined to wait, for the second set of options (such as slow-loading or delay loaded checkout options) to load before proceeding, since the loading cursor is not initially presented to the customer. In this manner, the transaction may be simplified and completed more quickly, with fewer delays. As well, resources that have been reserved for the checkout transaction may be more quickly freed up for other purposes.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A checkout management system comprising:
at least one processor and at least one memory, the at least one memory storing instructions executable by the at least one processor to cause the checkout management system to:
provide, to a remote client device via a network, a user interface for completing a checkout transaction, the user interface including an options category associated with the checkout transaction, the options category to be populated by an associated two or more checkout options during the checkout transaction;
transmit, via the network, requests to obtain respective ones of the two or more checkout options for populating the options category, at least one of the transmitted requests being transmitted to a remote third-party server of a service provider providing at least one of the checkout options;
identify, based on response times to the transmitted requests, a subset of the checkout options as a first set of checkout options and one or more others of the checkout options as a second set of checkout options the first set of checkout options being one or more checkout options having response times within a cut-off time and the second set of checkout options being one or more checkout options associated with transmitted requests still awaiting responses by the cut-off time;
after identifying the first set of checkout options, instruct the remote client device to update the user interface at the remote client device, wherein in the updated user interface the options category displays at least one of the checkout options from the first set of checkout options as a selectable checkout option after receipt of a reply to one or more of the requests and prior to display of the second set of checkout options, the second set of checkout options being hidden from display and unselectable in the user interface; and
complete the checkout transaction in communication with a commerce management engine, wherein completion of the checkout transaction includes selecting one of the checkout options from the first set of checkout options displayed on the user interface, prior to receiving responses from the respective requests for all of the second set of checkout options.

2. The checkout management system of claim 1, wherein one option of the first set of checkout options displayed is automatically selected as a default option, and wherein the at least one processor is further configured to execute the instructions to communicate with the checkout management system to:
responsive to selection of an option to complete the checkout transaction, complete the checkout transaction using the default option.

3. The checkout management system of claim 1, wherein the at least one processor is further configured to execute the instructions to cause the checkout management system to:
responsive to selection of a selectable user interface element of the user interface at the remote client device, instruct the remote client device to display any remaining checkout options of the first set of checkout options, and wherein the updated user interface further displays:
a loading indicator for the second set of checkout options when responses from the respective requests have not all been received; or
the second set of checkout options for which responses from the respective requests have all been received.

4. The checkout management system of claim 1, wherein the at least one processor is further configured to execute the instructions to cause the checkout management system to transmit the requests for checkout options in response to detecting a trigger event.

5. The checkout management system of claim 4, wherein the options category relates to shipping and the trigger event is receipt of a shipping address.

6. The checkout management system of claim 1, wherein the cut-off time is one of:
a static cut-off time for receiving a response;
a dynamic cut-off time for receiving a response; or
a historical cut-off time based on historical measurements for receiving a response from similar requests.

7. The checkout management system of claim 6, wherein the cut-off time is the dynamic cut-off time, the dynamic cut-off time being dynamically determined for a customer based on historical response times associated with the customer.

8. The checkout management system of claim 1, wherein the at least one processor is further configured to execute the instructions to cause the checkout management system to:
responsive to selection of a selectable user interface element of the user interface, further instruct the remote client device to update the user interface at the remote client device to:
display any remaining checkout options of the first set of checkout options; and
display at least one checkout option of the second set of checkout options after receiving a response from a respective request for the at least one checkout option of the second set of checkout options, prior to displaying at least one other checkout option of the second set of checkout options that is still awaiting for a response.

9. The checkout management system of claim 1, wherein, in the updated user interface, the options category displays all of the checkout options from the first set of checkout options prior to display of the second set of checkout options.

10. The checkout management system of claim 1, wherein, in the updated user interface, the options category displays two or more checkout options from the first set of checkout options prior to display of the second set of checkout options, and wherein the two or more checkout options from the first set of checkout options are ranked based on a checkout criterion.

11. A method comprising:
providing, by at least one processor, a user interface to a remote client device via a network for completing a checkout transaction, the user interface including an options category associated with the checkout transaction, the options category to be populated by an associated two or more checkout options during the checkout transaction;
transmitting, by the at least one processor via the network, requests to obtain respective ones of the two or more checkout options for populating the options category, at least one of the transmitted requests being transmitted to a remote third-party server of a service provider providing at least one of the checkout options;
identifying, by the at least one processor, based on response times to the transmitted requests, a subset of the checkout options as a first set of checkout options and one or more others of the checkout options as a second set of checkout options, the first set of checkout options being one or more checkout options having response times within a cut-off time and the second set of checkout options being one or more checkout options associated with transmitted requests still awaiting responses by the cut-off time;
after identifying the first set of checkout options, instructing the remote client device, by the at least one processor, to update the user interface at the remote client device, wherein in the updated user interface the options category displays at least one of the first set of checkout options as a selectable checkout option after receipt of a reply to one or more of the requests and prior to display of the second set of checkout options, the second set of checkout options being hidden from display and unselectable in the user interface; and
completing the checkout transaction, by the at least one processor in communication with a commerce management engine, wherein completion of the checkout transaction includes selecting one of the at least one of the first set of checkout options displayed on the user interface, prior to receiving responses from the respective requests for all of the second set of checkout options.

12. The method of claim 11, further comprising:
automatically selecting one of the at least one of the first set of checkout options displayed as a default option; and
responsive to selection of an option to complete the checkout transaction, completing the checkout transaction using the default option.

13. The method of claim 11, further comprising:
responsive to selection of a selectable user interface element of the user interface at the remote client device, further instruct the user interface at the remote client device to display any remaining quick checkout options of the first set of checkout options, and wherein the updated user interface further displays:
a loading indicator for the second set of checkout options when responses from the respective requests have not all been received; or
the second set of checkout options for which responses from the respective requests have all been received.

14. The method of claim 11, further comprising:
detecting a trigger event and, in response, causing a checkout management system to transmit the requests for checkout options.

15. The method of claim 14, wherein the options category relates to shipping and the trigger event is receipt of a shipping address.

16. The method of claim 11, wherein the cut-off time is one of:
a static cut-off time for receiving a response;
a dynamic cut-off time for receiving a response; or
a historical cut-off time based on historical measurements for receiving a response from similar requests.

17. The method of claim 16, wherein the cut-off time is the dynamic cut-off time, the dynamic cut-off time being dynamically determined for a customer based on historical response times associated with the customer.

18. The method of claim 11, further comprising:
responsive to selection of a selectable user interface element of the user interface, further instruct the remote client device to update the user interface at the remote client device to:
display any remaining checkout options of the first set of checkout options; and
display at least one checkout option of the second set of checkout options after receiving a response from a respective request for the at least one checkout option of the second set of checkout options, prior to displaying at least one other checkout option of the second set of checkout options that is still awaiting for a response.

19. The method of claim 11, wherein, in the updated user interface, the options category displays all of the checkout options from the first set of checkout options prior to display of the second set of checkout options.

20. A non-transitory computer-readable medium storing instructions that, when executed by a processor of a checkout management system, cause the checkout management system to:
provide, to a remote client device via a network, a user interface for completing a checkout transaction, the user interface including an options category associated with the checkout transaction, the options category to be populated by an associated two or more checkout options during the checkout transaction;

transmit, via the network, requests to obtain respective ones of the two or more checkout options for populating the options category, at least one of the transmitted requests being transmitted to a remote third-party server of a service provider providing at least one of the checkout options;

identify, based on response times to the transmitted requests, a subset of the checkout options as a first set of checkout options and one or more others of the checkout options as a second set of checkout options, the first set of checkout options being one or more checkout options having response times within a cut-off time and the second set of checkout options being one or more checkout options associated with transmitted requests still awaiting responses by the cut-off time;

after identifying the first set of checkout options, instruct the remote client device to update the user interface at the remote client device, wherein in the updated user interface the options category displays at least one of the first set of checkout options as a selectable checkout option after receipt of a reply to one or more of the requests and prior to display of the second set of checkout options, the second set of checkout options being hidden from display and unselectable in the user interface; and complete the checkout transaction, in communication with a commerce management engine, wherein completion of the checkout transaction includes selecting one of the at least one of the first set of checkout options displayed on the user interface, prior to receiving responses from the respective requests for all of the second set of checkout options.

\* \* \* \* \*